United States Patent [19]

Ohara et al.

[11] 4,390,882
[45] Jun. 28, 1983

[54] DENSITY ADJUSTING METHOD IN IMAGE RECORDING

[75] Inventors: Yuji Ohara; Kazuo Horikawa, both of Kanagawa, Japan

[73] Assignee: Fuji Photo Film Co., Ltd., Kanagawa, Japan

[21] Appl. No.: 318,538

[22] Filed: Nov. 5, 1981

[30] Foreign Application Priority Data

Nov. 11, 1980 [JP] Japan .............................. 55/158516

[51] Int. Cl.³ .......................................... G01D 15/14
[52] U.S. Cl. .................................... 346/1.1; 346/108; 358/298
[58] Field of Search ................. 346/108, 1.1; 358/296, 358/298

[56] References Cited

U.S. PATENT DOCUMENTS 4,245,228 1/1981 Cook .................................... 346/108
4,251,821 2/1981 Kimura .............................. 346/108
4,347,523 8/1982 Ohara ................................. 346/108

Primary Examiner—Joseph W. Hartary
Assistant Examiner—Derek Jennings
Attorney, Agent, or Firm—Sughrue, Mion, Zinn, Macpeak and Seas

[57] ABSTRACT

In a process of image recording by scanning a recording material with a light beam modulated by an image signal, the density of the recorded image is adjusted by controlling the light intensity during a predetermined interval using a clock pulse for picture elements, recording an image for a predetermined time within the predetermined interval, and changing the predetermined recording time for the entire image or only portions thereof. The recording time is changed in a very simple manner, for example, by operating a variable resistor.

7 Claims, 6 Drawing Figures

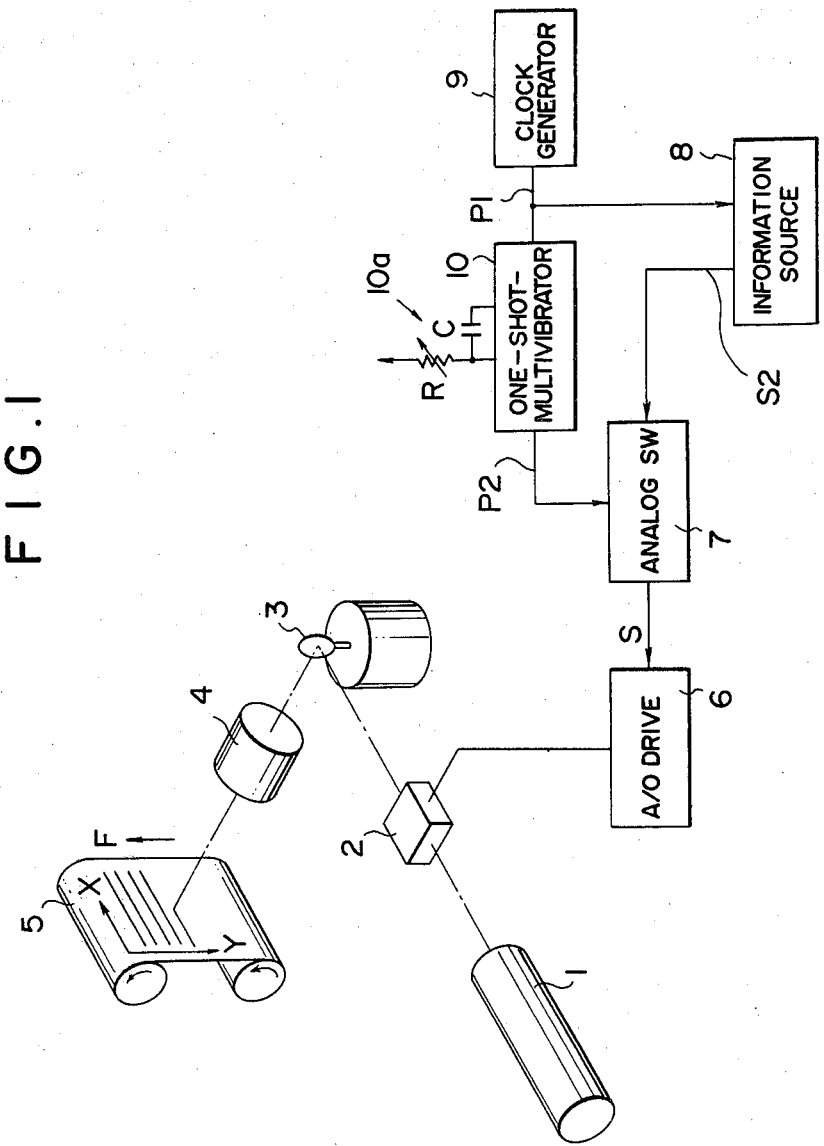

DENSITY ADJUSTING METHOD IN IMAGE RECORDING

BACKGROUND OF THE INVENTION

1. Field of the Invention

This invention relates to an image recording process using a light beam, and particularly a process of recording an image by scanning a recording material in two directions with a light beam such as laser beam.

More particularly, this invention relates to a method of adjusting the density of the entire image or portions thereof in a process of recording the image on a photosensitive material capable of halftone recording, for example a photographic film, by scanning the photosensitive material with a light beam.

2. Description of the Prior Art

Conventionally, to adjust the image density in the image recording process as described above, a density filter is inserted into the optical path of the light beam for the purpose of decreasing the image density. Alternatively, the level of the image signal is changed by use of an electric circuit.

Such conventional methods aim to change the intensity level of the light beam impinging upon the photosensitive material in order to adjust the image density. However, because of the non-linearity of the characteristic curve of the photosensitive material, it is extremely difficult to reproduce the desired gradation only by simply changing the intensity level of the light beam as in the conventional method. The conventional method using a density filter cannot compensate for the non-linearity of the characteristic curve of the photosensitive material. Thus, the conventional method of this type can change the image density only within the range of relative linearity of the characteristic curve of the photosensitive material. In the conventional method wherein an electric circuit is used to change the level of the image signal, a complicated control system is required to achieve non-linear intensity change so as to cope with the non-linearity of the characteristic curve of the photo-sensitive material.

SUMMARY OF THE INVENTION

The object of the present invention is to provide a method of adjusting the image density in image recording, which can eliminate the above described disadvantages of the conventional methods.

Another object of the present invention is to provide an image density adjusting method which can correctly adjust the image density over a wide range in analog light intensity modulation.

A further object of the present invention is to provide an image density adjusting method which can adjust the density of the whole image or only portions thereof in an extremely simple manner.

A still further object of the present invention is to provide an image density adjusting method which does not require any additional control to compensate for the nonlinearity of the characteristic curve of the photosensitive material and which is practically advantageous.

The method of the present invention is characterized by controlling the intensity of a light beam during a predetermined interval by use of a clock pulse for picture elements, recording an image only for a predetermined time within said predetermined interval and not recording for the rest of said predetermined interval, and changing said predetermined time for each image or for respective portions of the image where the density is to be changed, thereby adjusting the density of the recorded image. Namely, when recording an image by using a predetermined exposure time (T) for each picture element and modulating the light intensity (I), the image density is adjusted by keeping the light intensity (I) unchanged and changing the exposure time (T) for each image to be recorded or for respective desired portions of the image. In this way, the density level can be adjusted without giving any particular attention to controlling the exposure so as to compensate for the non-linearity of the characteristic curve of the photosensitive material.

In the method of the present invention, the level of the image signal is not changed. Instead, a predetermined exposure time is used for each picture element, and this predetermined exposure time is changed for each image or for each portion of the image where the density is to be changed. Therefore, it is not necessary to use a control system for compensating for the non-linearity of the characteristic curve of the photosensitive material even when the level of the image density is changed. This is one of practically advantageous features of the method according to the present invention.

To change the above-described predetermined recording time within the predetermined control interval for the light beam intensity, the image signal which is input to the driver of a light beam modulator is turned on for the predetermined time within the predetermined light intensity control interval. This predetermined time, during which the image signal is turned on, is changed. This can be preferably done by, for example, inserting an analog switch into the signal transmission system between the image information source and the driver for the light beam modulator, and further using a one-shot-multivibrator. The one-shot-multivibrator generates pulses having a predetermined width according to clock pulses. The output of the one-shot-multivibrator is fed to the aforesaid analog switch.

BRIEF DESCRIPTION OF THE DRAWINGS

FIG. 1 is a schematic view showing an embodiment according to the present invention.

DESCRIPTION OF THE PREFERRED EMBODIMENTS

Figure 2A:
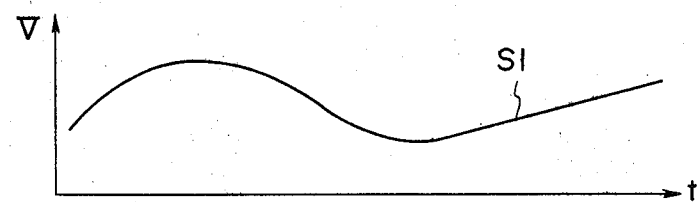
FIGS. 2A to 2E are time charts showing various signals used in the embodiment shown in FIG. 1.

Now the present invention will be described in detail with reference to the drawing.

Figure 2B:
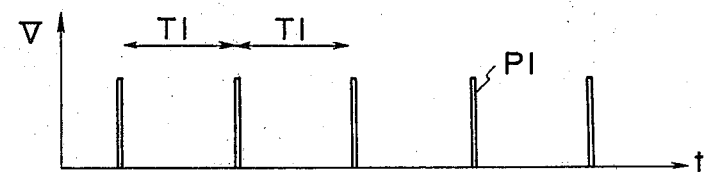
Figure 2C:
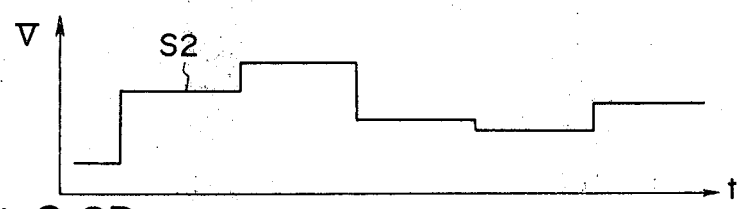
Figure 2D:
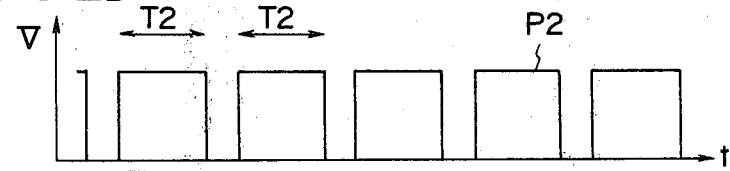

Referring to FIG. 1 showing one embodiment of the present invention, a laser beam generated by a laser source 1 is intensity-modulated by an A/O modulator 2. The modulated laser beam is then deflected by a galvanometer mirror 3 and used to scan a photosensitive material 5 in the X direction (main scanning direction) through a lens 4. The photosensitive material 5 is moved in the F direction so that the laser beam can also scan in the Y direction (subsidiary scanning direction). The A/O modulator 2 is driven by an A/O modulator driver 6 and conducts the intensity modulation of the laser beam. To the driver 6, an image signal is inputted from an information source 8 via an analog switch 7. The information source 8 generates an image signal S1 (FIG. 2A). The information source 8 receives a clock pulse P1 occurring at predetermined intervals (T1) (FIG. 2B) from a standard clock generator 9. The level of the image signal S1 in the information source 8 is changed each time the information source 8 receives a clock pulse P1. In this way, a stepped image signal S2 (FIG. 2C) is output from the information source 8. This image signal S2 is transmitted through the analog switch 7, and then inputted to the driver 6 for a predetermined time (T2) (FIG. 2D) within the predetermined interval (T1).

The analog switch 7 receives an output P2 (FIG. 2D) from a one-shot-multivibrator 10. This pulse P2 (FIG. 2D) has a predetermined duration (pulse width T2) within the predetermined interval (T1) of the clock pulse P1. The pulse P2 is generated by the one-shot-multivibrator 10 when it receives the clock pulse P1 from the standard clock generator 9. Accordingly, upon passing through the analog switch 7, the image signal S2 is converted to a signal S (FIG. 2E) having the predetermined duration (pulse width T2) within the predetermined interval (T1) of the clock pulse P1. This signal S is fed to the driver 6. In this way, the driver 6 drives the A/O modulator 2 according to the signal S.

Figure 2E:
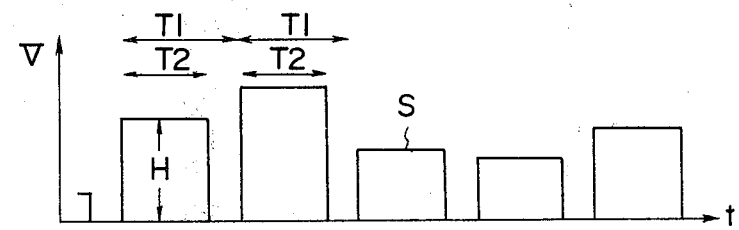

As shown in FIG. 2E, the signal S has the predetermined duration (T2) and the modulated intensity (i.e. the height H of the pulse). The image is recorded at a level of exposure determined by the intensity of the signal S. Therefore, the density level of every portion throughout the entire image can be adjusted to the desired level by changing the predetermined pulse duration (T2) of the signal S.

The predetermined pulse duration (T2) can be changed by providing, a time constant circuit 10a having a variable resistor R on the one-shot-multivibrator 10 and varying the setting of the variable resistor.

It should be understood that the present invention can be embodied in various ways other than the above described embodiment. For instance, there are many other ways to input the image signal to the driver for the predetermined time within the predetermined intervals.

As described above, in accordance with the present invention, the image signal is supplied to the light modulator for the predetermined time within the predetermined interval, and this predetermined time for supplying the image signal is adjustable. Accordingly, the density of the recorded image can be adjusted as desired for each image or at a desired portion or portions of one image in a very simple manner.

We claim:

1. In a process of recording an image by scanning a recording material with a light beam modulated by an image signal,
a method of adjusting the image density in the image recording which comprises the steps of; controlling the intensity of a light beam at predetermined intervals as a function of a clock pulse for obtaining picture elements of said image, recording a picture element only for a predetermined recording time within each said predetermined interval and not effecting recording of a picture element for the remainder of said predetermined interval, and adjusting the density of the entire recorded image by changing said predetermined recording time.

2. A method of adjusting the image density in the image recording as defined in claim 1 wherein said light beam is a laser beam.

3. A method of adjusting the image density in the image recording as defined in claim 1 or 2 wherein said light beam scans the recording material in two directions.

4. A method of adjusting the image density in the image recording as defined in claim 1 or 2 wherein said predetermined recording time is changed by turning on the image signal, which is input to a means for driving a light beam modulator, for a predetermined time during said predetermined interval and changing said predetermined time during which said image signal is turned on.

5. A method of adjusting the image density in the image recording as defined in claim 4 wherein an analog switch means is inserted into the signal transmission system between an image information source and said means for driving a light beam modulator.

6. A method of adjusting the image density in the image recording as defined in claim 5 wherein a one-shot-multivibrator means is used to generate a pulse having a predetermined width, and the output of said one-shot-multivibrator means is fed to said analog switch means.

7. A method of adjusting the image density in the image recording as defined in claim 6 wherein a time constant circuit having a variable resistor is connected to said one-shot-multivibrator means, and the setting of said variable resistor is changed to change said predetermined time.

* * * * *